Jan. 20, 1942.  C. A. RUESENBERG  2,270,477
FRICTION CLUTCH
Filed Oct. 25, 1939
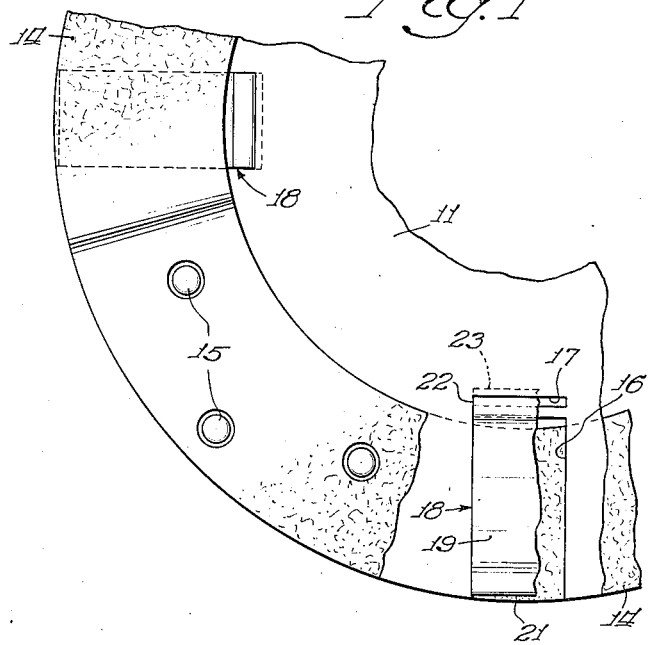
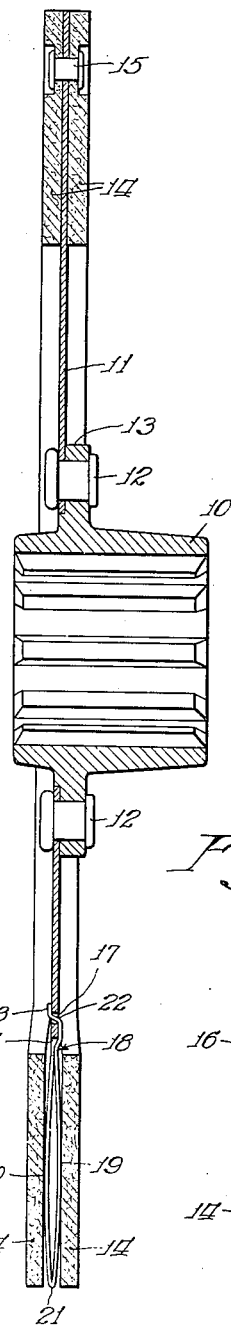
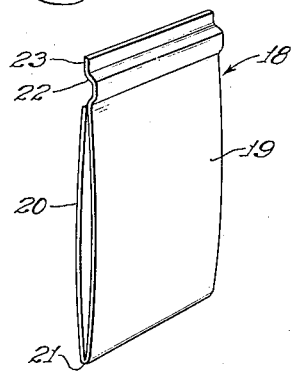
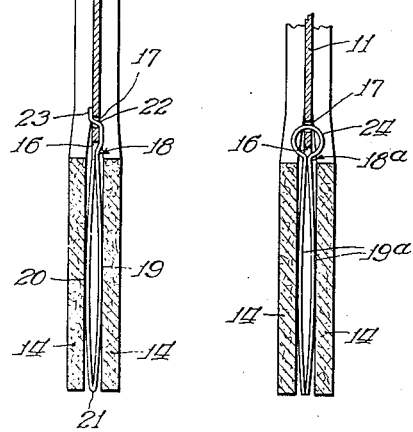
Inventor:
Carl A. Ruesenberg
By: Edward C. Gritzbaugh
Atty.

Patented Jan. 20, 1942

2,270,477

UNITED STATES PATENT OFFICE 2,270,477

FRICTION CLUTCH

Carl A. Ruesenberg, Rockford, Ill., assignor to Borg-Warner Corporation, Chicago, Ill., a corporation of Illinois Application October 25, 1939, Serial No. 301,136

6 Claims. (Cl. 192—107)

This invention relates to friction clutch plates and has as its object to provide a plate of the cushioning type, which is of relatively simple, durable and inexpensive construction.

By "cushioning type" I have reference to that type of clutch plate wherein facings are urged apart, when the clutch is disengaged, by cushioning means such as springs interposed between the facings at circumferentially spaced intervals. A particular object of the present invention is to provide an improved arrangement wherein the cushions are attached to the disc upon which the facings are mounted, in a very simple and inexpensive manner eliminating the necessity for employing rivets or other permanent fastening means.

A further object of the invention is to provide a clutch plate wherein the cushion elements are readily detachable and may if desired be removed and renewed upon the occasion of refacing a clutch plate.

To the attainment of the foregoing objects, the invention provides a clutch plate wherein the cushions are disposed in radial slots in the peripheral region of the mounting disc, are attached at their inner ends to the disc so as to resist centrifugal force, and are confined against circumferential displacement by engagement of their end regions between the side edges of the slots. In one of its aspects, the invention contemplates an arrangement wherein the cushions are hooked at their inner ends into apertures in the mounting disc and are maintained against detachment from said apertures by the confinement of the springs between the facings.

An important aspect of the invention is the arrangement of the cushions so that those portions which are engaged between the facings are adapted to collapse or yield to positions lying entirely within the confines of the radial slots, so that the facings may under clutch engagement lie flatly in contact with the mounting disc throughout their entire areas with no bulges at any point.

Other objects, the advantages and uses of the invention will become more apparent after reading the following specification and claims, and after consideration of the drawing forming a part of the specification, wherein:

Fig. 1 is a rear elevation of a portion of a clutch plate embodying the invention, partly broken away to better illustrate the construction;

Fig. 2 is an axial sectional view of the same;

Fig. 3 is a perspective view of one of the cushioning springs of the preferred form of the invention; and Fig. 4 is a sectional view of a portion of a modified form of the invention.

As an illustration of one form in which the invention may be embodied, I have shown in the drawing a clutch plate adapted to be incorporated in a conventional friction clutch of the type employed in motor vehicles. Such a clutch plate may include a hub 10 adapted to be splined upon a drive shaft, a mounting disc 11 of annular form riveted as at 12 to a flange 13 forming an integral part of the hub 10, and friction facings 14 riveted as at 15 to the peripheral region of the disc 11.

The present invention provides a series of circumferentially spaced radial slots 16 in the peripheral region of the mounting disc 11. Adjacent the inner end of each slot 16, an aperture 17 is provided in the disc 11. Threaded into the aperture 17 is an end region of a cushion spring 18 extending radially outwardly in the slot 16.

In the form of the invention shown in Figs. 1 and 2, the cushion spring 18 comprises a pair of opposed portions 19 and 20 respectively, axially bowed away from each other beyond the planes of the respective sides of the disc 11 and engaging the inner surfaces of the facings 14 so as to urge them apart. The portions 19 and 20 are joined at their radially outer extremities by a bend 21 which is located in the slot 16 and confined between the side edges of the slot so as to prevent circumferential displacement of the outer region of the spring. The inner end region of the portion 19 is provided with a hook 22 which is hooked through the aperture 17 and maintained against disengagement therefrom by the confinement of the spring between the facings 14. The hook 22 may be provided with an end flange 23 adapted to engage the face of the disc 11 opposite that engaged by the hook 22, so as to additionally insure against the hook 22 becoming disengaged from the aperture 17.

The spring 18 is of ribbon form, i. e., formed from spring strip metal, and is a trifle less in width than the width of the slot 16. The aperture 17 has a length corresponding to the width of the slot 16, and registers with the inner end of the slot. Thus the engagement of the hook 22 in the aperture 17, in cooperation with the engagement of the bend 21 between the edges of the slot 16, securely positions the spring 18 against either radial or circumferential displacement. Axial displacement of the spring is of course prevented by the confinement of the spring between the facings 14.

In the assembly of the plate, the springs 18 are assembled prior to the attachment of the facings 14. In thus attaching a spring, it is only necessary to tilt it to a position wherein its longitudinal axis projects transversely to the plane of the disc 11, and to insert the flanged end region 23 into the aperture 17. The spring may then be pivoted around the aperture 17 until its main body portion is roughly in the plane of the disc 11, with the bend 21 disposed in the slot 16. The attachment of the facings maintains the spring in this position.

In the operation of the clutch plate, the facings 14 are adapted to be engaged between a pair of cooperating friction members such as the flywheel and pressure plate of a motor vehicle clutch. Under such axial pressure, the springs 18 are adapted to yield until the bowed portions 19 and 20 lie flatly in engagement with each other. In this position the springs will be entirely encompassed within the planes of the respective sides of the disc 11 so that the facings 14 may lie flatly over the slots 16 with their inner faces in the planes of the respective faces of the disc 11, and without any bulge at any point. This is an important advantage for the reason that it avoids uneven wearing of the facings in the regions of cushioning action. In this respect, the invention is a distinct improvement over those clutch plates wherein the springs, when collapsed, lie against the faces of the disc and therefore project beyond such faces, causing the facings to bulge where they pass over the springs.

In the form of the invention shown in Fig. 4, the spring 18a is of a type which may be called a "hairpin" form. The cushioning portions 19a of this spring are joined at their radially inner ends by a loop 24 which is threaded through the aperture 17 of the disc 11. The outer ends of the spring are unconnected, but are adapted to engage each other within the slot 16 as shown.

In either form of the invention, the spring 18 is generally elliptical in form, embodying two oppositely bowed portions, both end regions of which are in abutting engagement or adjoining relationship. The inner end portions 22 and 24 of the respective springs, which pass across the faces of the discs 11 between the slots 16 and the apertures 17, are disposed entirely within the inner periphery of the facings 14 so as to avoid causing the occurrence of bulges in the facings. Those portions of the springs which are interposed between the facings, are adapted to lie entirely within the slot 16 when the clutch is engaged. To this end, the thickness of the springs may be half or less than half the thickness of the disc 11. It is preferred to have the thickness of the springs approximately half that of the disc, in order that the outer surfaces of the springs may lie in substantially the planes of the respective faces of the disc, thereby supporting the facings 14 across the slots 16, under clutch engaging pressure.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:

1. In a friction clutch plate, a pair of axially spaced friction facings, a mounting disc having a peripheral region extending between and supporting said facings, said peripheral region having a portion thereof cut away, and a cushion spring, roughly elliptical in longitudinal contour having oppositely bowed intermediate regions engaging the inner surfaces of said facings, an end region confined in said cut away portion of said disc, said spring being adapted to urge said facings apart when the clutch is disengaged and to yield under clutch engaging pressure to a position wherein said intermediate regions are completely encompassed within the extended planes of the respective sides of said mounting disc, said spring being attached at its radially inner end region to said mounting disc adjacent the radially inner extremity of said slot and thereby supported against displacement under centrifugal force.

2. In a friction clutch plate, a pair of axially spaced friction facings, a mounting disc having a peripheral region extending between and supporting said facings, said peripheral region having a portion thereof cut away, and a cushion spring of ribbon form, substantially rectangular in profile and disposed with major portions thereof located within said cut away portions, and having opposed bowed portions in contact with the inner surfaces of said facings and one end region attached to said mounting disc, and thereby supported against displacement under centrifugal force, said spring being adapted to urge said facings apart when the clutch is disengaged and to yield under clutch engaging pressure to a position wherein said bowed portions are completely encompassed within the extended planes of the respective sides of said mounting disc.

3. In a friction clutch plate, a pair of axially spaced annular friction facings, a mounting disc having a peripheral region extending between and supporting said facings, said peripheral region having a portion thereof cut away, and a cushion spring attached at one end region to the disc adjacent the inner extremity of said cut away portion of said disc and thereby supported against displacement under centrifugal force, projecting radially outwardly, having intermediate regions integrally connected at one end region, bowed away from each other and engaging the inner surfaces of said facings so as to urge said facings apart when the clutch is disengaged, said bowed portions being adapted to yield under clutch engaging pressure to a position wherein said bowed portions are completely encompassed within the extended planes of the respective sides of said mounting disc so as to allow said facings to assume a completely flat condition throughout their area.

4. In a friction clutch plate, a pair of axially spaced friction facings, a mounting disc having a peripheral region extending between and supporting said facings, said peripheral region having portions thereof cut away and cushion springs each attached at one end region to said mounting disc and thereby supported against displacement under centrifugal force, said cushion springs having the major portion thereof confined in the spaces defined by the edges of said cut away portions and by the adjacent surfaces of said friction facings, said cushion springs each including a pair of opposed portions bowed away from each other and joined together at their outer end regions, one of said cushion spring portions having at its radially inner end a hook-like part serving to secure the cushion spring to the disc.

5. In a friction clutch plate, a pair of axially spaced friction facings, a mounting disc having a peripheral region extending between and supporting said facings, said peripheral region having portions thereof cut away and cushion springs each attached at one end region to said mounting disc and thereby supported against displacement under centrifugal force, said cushion springs having the major portion thereof confined in the spaces defined by the edges of said cut away portions and by the adjacent surfaces of said friction facings, each of said cushion springs including a pair of oppositely bowed opposed portions joined together at their outer ends, one of said spring portions having its inner end formed to provide a hook-shaped part disposed in an aperture formed in said disc adjacent the inner end of said cut away portion.

6. In a friction clutch plate, a pair of axially spaced friction facings, a mounting disc having a peripheral region extending between and supporting said facings, said peripheral region having portions thereof cut away and cushion springs each attached at one end region to said mounting disc and thereby supported against displacement under centrifugal force, said cushion springs having the major portion thereof confined in the spaces defined by the edges of said cut away portions and by the adjacent surfaces of said friction facings, said cushion springs being of generally hairpin shape and each having a pair of semi-elliptic portions the end regions of which are confined in said cut away portions of said disc and each having intermediate regions which are bowed axially away from each other to engage the inner surfaces of said facings, each of said cushion springs being further formed with a loop portion connecting said semi-elliptic portions at their inner ends, said loop portion being threaded through an aperture in said disc adjacent the radially inner ends of said cut away portions.

CARL A. RUESENBERG.